United States Patent [19]

Pijanowski et al.

[11] Patent Number: 4,802,601
[45] Date of Patent: Feb. 7, 1989

[54] HOUSING

[75] Inventors: Stefan Pijanowski, Peterborough; Peter Thompson, Bourne End; Adrian Dartnall, Loughborough, all of United Kingdom

[73] Assignee: Amaray International Ltd., Buckinghamshire, England

[21] Appl. No.: 7,698

[22] Filed: Jan. 27, 1987

[51] Int. Cl.⁴ .............................................. B65D 6/00
[52] U.S. Cl. ................................. 220/4 R; 220/4 E; 220/1 A; 206/444; 206/387
[58] Field of Search .............. 220/4 R, 4 B, 4 E, 4 C, 220/1 A, 253, 306, 345, 350, 351, 354, 400; 229/23 R; 206/387, 581, 444

[56] References Cited
U.S. PATENT DOCUMENTS

| | | |
|---|---|---|
| 2,741,390 | 4/1956 | Moore .............................. 220/4 R |
| 3,487,991 | 12/1968 | Stern ............................... 229/23 R |
| 3,908,905 | 9/1975 | Von Philipp et al. ............. 220/4 E |
| 4,019,674 | 4/1977 | Ikelheimer et al. .............. 229/23 R |
| 4,049,357 | 9/1977 | Hamisch, Jr. ..................... 220/4 E |
| 4,102,485 | 4/1978 | Johnson .......................... 229/23 R |
| 4,316,539 | 2/1982 | Torrington ....................... 206/307 |
| 4,519,893 | 5/1985 | Olas ................................ 206/444 |
| 4,634,004 | 1/1987 | Mortensen ....................... 206/387 |

FOREIGN PATENT DOCUMENTS

| | | |
|---|---|---|
| 1154841 | 6/1969 | United Kingdom . |
| 2026427 | 2/1980 | United Kingdom . |
| 2130557 | 6/1984 | United Kingdom . |

Primary Examiner—Willis Little
Attorney, Agent, or Firm—Seed and Berry

[57] ABSTRACT

A container comprising two identical rigid molded frame members and an initially flat sheet of flexible material adapted to be received and retained in a channel in the frame member.

6 Claims, 1 Drawing Sheet

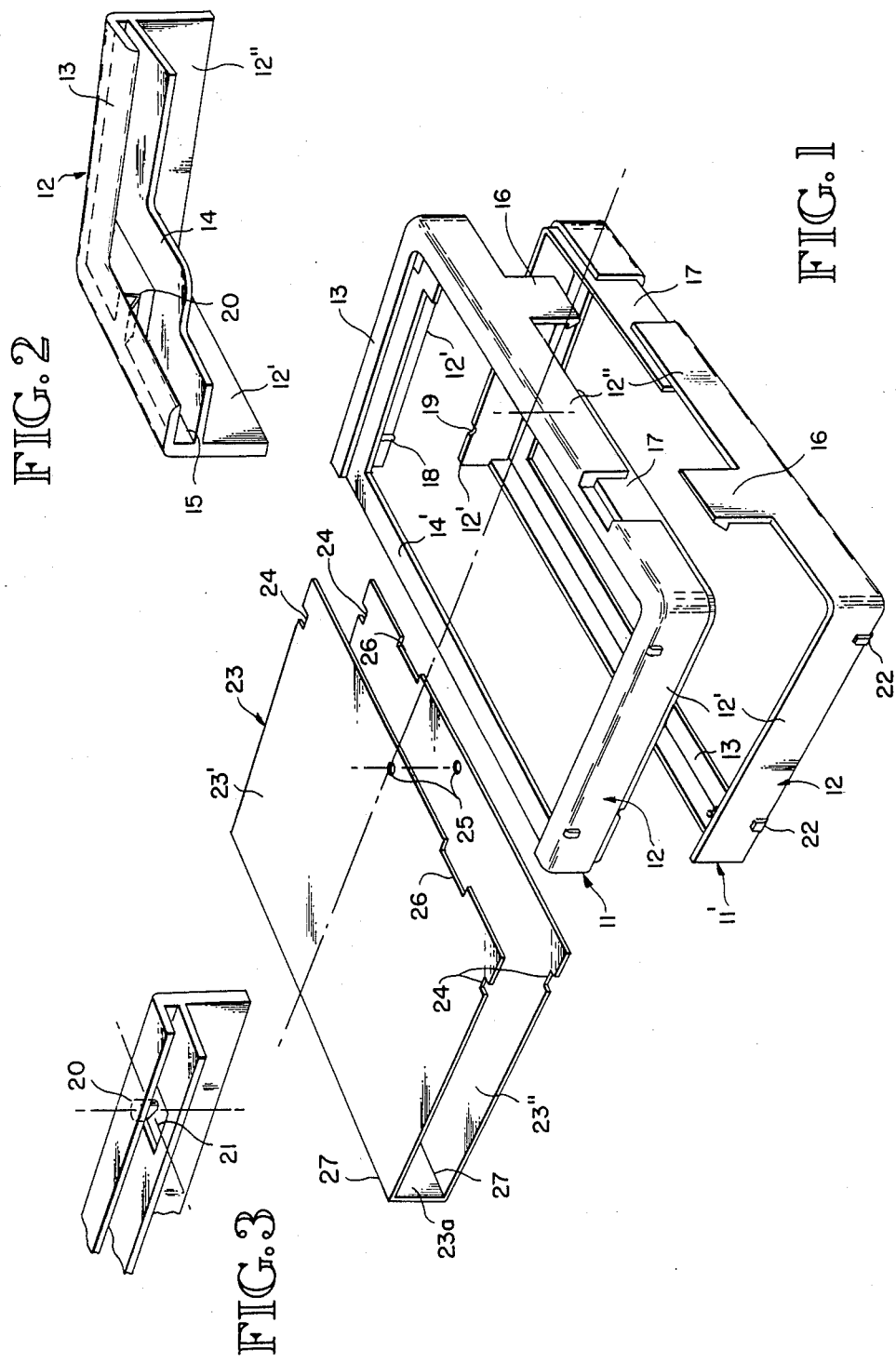

HOUSING

TECHNICAL FIELD

The present invention relates to housings or containers of the type primarily suitable for video cassettes and other forms of magnetic recording media such as audio and data cassettes. However, such housings or containers are also suitable for other purposes, for example, containers for cosmetics, food or other dry goods.

DISCLOSURE OF INVENTION

An object of the present invention is to provide a housing or container which can be manufactured economically and wherein at least one wall can be readily printed or decorated to indicate the contents.

According to the present invention a housing comprises at least two party, one being a molded rigid frame member and the other an initially flat flexible sheet material member adapted to be received and retained in the frame member. The frame is preferably constructed in two parts to facilitate insertion of the sheet material member thereinto. In designs in which, prior to insertion in the frame parts, the sheet material is hinged or bent at a sharp angle it may be scored or otherwise adapted to facilitate such.

Both inner and outer surfaces of the sheet member can be pre-printed or decorated to describe the contents.

Preferably the frame member comprises moldings of rigid thermoplastic or thermosetting plastics material such as polypropylene or polystyrene. The flexible sheet material insert may be made of cardboard or any suitable synthetic sheet material suitable to receive printing or self decoration.

Where two moldings are used in each assembly, these can advantageously be similar and twin closure slips may be used to provide a symmetrical construction.

The final shape of the housing is only dictated by its eventual use and the fact that the sheet material member must be capable of being inserted and held in the frame.

Also according to the present invention there is provided a housing or container comprising spaced apart front and rear walls and side walls defining a receiving space for the container contents, characterized by the feature that at least one molded frame means forms at least one side wall or side wall portion of the container and defines a wall space in which a front wall and/or a rear wall of the container are/is locatable, and at least one sheet of semi-flexible or flexible material forms the front wall and/or rear wall of the container.

Where a single frame means is provided such may comprise a frame member having spaced apart receiving means for the front and rear wall portions of flexible sheet such that a space is defined between said portions in which the container contents may be received. In such arrangement, the initially flat sheet material will be folded over or otherwise bent over or formed so as to enable the front and rear wall portions to be located in the receiving means of the frame member which may, for example, comprise, respectively, a rebate on a front edge of the frame with releasable retaining means for the front wall portion of the flexible sheet and a channel track or like retaining means for the rear wall portion of the flexible sheet. In this arrangement, the front-wall portion of the flexible sheet would form the hinged front flap and access means to the container.

In a further arrangement according to the invention there is provided a housing or container comprising spaced apart front and rear wall and side walls defining a receiving space for the container contents, characterized by the feature that one or more molded, peripheral frame means form a side wall or side walls or part side walls of the container and defines spaces in which a front wall and a rear wall of the container are locatable when received by the receiving means of the frame means; and that one or more initially flat sheet of flexible material is adapted to form the front and rear walls of the container; each said frame means having two spaced or at least one receiving means to receive a portion or portions of said sheet forming the front and rear walls.

In a more specific and preferred embodiment of the invention a housing for use in the assembly of a container having front and rear walls and side walls defining the receiving space of the container with the front wall being displaceable relative to the rear wall, comprises two rectangular, identical molded frame members which, when disposed one inverted relative to the other and rotated through 180° are releasably interengageable by means of co-operable interengageable catch means, said frame members each defining a central space for receiving wall means provided by sheet material retainably received in a channel or support means provided in an inner peripheral region of the frame members, and wherein the catch means include a projecting portion and a recessed portion and are molded with the frame members and asymmetrically disposed on either side of a central axis so as to enable interengagement when the two frame members are brought together in their operative disposition.

Such frame members are to be assembled with the sheet material which forms the front and rear walls and the thus assembled container is characterized in that a single sheet of initially flat flexible material forms the front and rear walls after being folded or bent in a central region which forms the flexible hinge means (spine) joining the two frame members; in that said sheet has recesses and/or apertures in the edges and/or edge regions for engagement by resilient or flexible projections formed with the frame members and projecting at least into said channel or support means region so as to engage said sheet. It will be appreciated that in this preferred embodiment considerable savings in material assembly stages are achieved and, importantly, it is possible for the front wall to be readily printed or decorated prior to assembly and for the outer and inner surfaces to be printed or decorated and such considerations may also apply to the rear wall. The flexible sheet material may be preprinted as a run of considerable length and have cut outs and apertures formed and be separated into individual inserts for two frame members.

BRIEF DESCRIPTION OF THE DRAWINGS

The invention will now be described further, by way of example, with reference to the accompanying drawings, in which:

FIG. 1 is an exploded view of two frame members and a folded sheet material part prior to insertion thereinto;

FIG. 2 is a detail of a corner of the frame member shown in FIG. 1; and

FIG. 3 is a detail of a barb on the frame member.

BEST MODE FOR CARRYING OUT THE INVENTION

In the drawings a frame comprises two identical parts 11, 11'. Each frame part 11, 11' has an upstanding wall 12 comprised of side portions 12' and 12" which when juxtaposed against the corresponding wall of the other part (11', 11) form the side walls of the container. Each frame part 11, 11' has an outer rim 13 at right angles to three edges of the wall 12 and an inner rim 14 spaced from the rim 13 around all four edges of the wall 12. In this way a groove 15 is formed between rim 12 and rim 14. A portion 14' of the rim 14 extends between the free ends of wall 12 to provide an interconnection and rigidity for the structure and to provide a support and fold surface for sheet 23 in the spine or hinge region. A snap lock 16 is offset from the central axis of the frame 11 and molded therewith. A corresponding groove 17 is offset to the other side of the central axis adapted to co-operate with the snap lock 16 to form catch means. A projection or boss 18 is provided on one edge of the wall 12 and a corresponding groove 19 is provided on a diametrically opposite portion of the wall. When the frame is closed, each boss 18 is inserted in its adjacent groove 19 thereby preventing relative movement of the two parts of the frame relative to each other. Three preferably integrally formed barbs 20 are provided, one in each outer corner and one in the center of the inner surface of the outer rim 13. The inner rim 14 is correspondingly apertured at 21 to receive the top of each barb.

Two spaced apart ridges 22 are provided on the outer surface of each side wall of the frame 11 which allows the assembled housing to stand.

A flexible sheet material insert 23 is grooved at 24 and apertured at 25 to co-operate with and be retained by the barbs 20 or like retention means of the frame members 11. Further grooves 26 are provided to enable the insert 23 to seat properly against the inside of the grooves 17. Parallel score lines 27 are made in the insert 23 so that when the insert is subsequently folded to form the inter-connection and flexible hinge means for the frame parts 11, 11', the housing will retain its shape. The insert 23 is fed into the grooves 15 of the frame members 11 when it is flat and the housing can thereafter be correctly folded in two due to the parallel scorings 27.

Various modifications and variations may be effected without departing from the scope of the invention as defined in the foregoing introductory and specific description and the appended claims. Each frame member may be substantially U-shaped or three-sided to form a right-angled channel-like outline when viewed in plan. Furthermore, and for example with reference to video cassette boxes, a frame member forming the front portion, and preferably with a frame member also forming the rear portion of the box, may be integrally molded and the front and rear portions interconnected by a hinge means with a flexible sheet being insertable into receiving means of the front frame member to form the front wall and preferably with a portion of said same flexible sheet also being insertable into receiving means of the rear frame member if provided in place of a normal known rear box-portion.

We claim:

1. A housing comprising spaced-apart front and rear walls and side walls defining a receiving space for the container contents, characterized by the feature that one or more molded, peripheral frame means form a side walls or walls or part side walls of the container and define spaces in which a front wall and a rear wall of the container are locatable when received by receiving means of the frame means; and that one or more initially flat sheets of flexible material are adapted to form the front and rear walls of the container; each said frame means having two spaced or at least one receiving means to receive portions or a portion of said sheet forming the front and rear walls, wherein two frame members are provided as the frame means, with each frame member having receiving means in the form of grooves or channel means with sheet engaging means for retainably receiving one of said flexible sheets or a portion of a flexible sheet which has another portion received by the other frame member.

2. A housing as claimed in claim 1, characterized in that the two frame members are identical and invertably disposed rotated through 180° relative to each other and are inter-connected at one side by hinge means and at another side by catch means to enable the frame members to be releasably inter-engageable.

3. A housing as claimed in claim 2, characterized in that a single flexible sheet forms the front and rear walls and a portion of the flexible sheet forms hinge means between the front and rear walls.

4. A housing for use in the assembly of a container having front and rear walls and side walls defining the receiving space of the container with the front wall being displaceable relative to the rear wall, comprising two, three-sided, identical molded frame members which, when disposed one inverted relative to the other and rotated through 180°, are releasably inter-engageable by means of co-operable inter-engageable catch means, said frame members each defining a central space for receiving wall means provided by sheet material retainably received in a channel and support means provided in an inner peripheral region of the frame members, and wherein the catch means include a projecting portion and a recessed portion and are molded with the frame members and disposed on either side of a central axis so as to enable inter-engagement when the two frame members are brought together in their operative disposition.

5. A housing assembled from the frame members of claim 1 in combination with the sheet material which forms the front and rear walls characterized in that a single sheet of initially flat flexible material forms the front and rear walls after being folded in a central region which forms a flexible hinge means joining the two frame members, in that said sheet has in the channel means for engagement by resilient projections formed with the frame members and projecting at least into said channel means so as to engage said sheet.

6. A housing or container as claimed in claim 5, characterized in that the channel means are provided on at least two opposite lateral side portions of the inner periphery of each frame member which (lateral portions) extend from and regions of a lateral portion interconnecting said opposite lateral side portions.

* * * * *

UNITED STATES PATENT AND TRADEMARK OFFICE
CERTIFICATE OF CORRECTION

PATENT NO. : 4,802,601

DATED : February 7, 1989

INVENTOR(S) : Stefan Pijanowski et al.

It is certified that error appears in the above-identified patent and that said Letters Patent is hereby corrected as shown below:

Claim 5, column 4, line 49, delete "claim 1" and substitute therefor --claim 4--.

Signed and Sealed this

Twenty-sixth Day of September, 1989

Attest:

DONALD J. QUIGG

*Attesting Officer*  *Commissioner of Patents and Trademarks*